United States Patent
Klapproth et al.

(10) Patent No.: US 8,466,723 B2
(45) Date of Patent: Jun. 18, 2013

(54) CLOCK GENERATOR

(75) Inventors: Peter Klapproth, Waalre (NL); Greg Ehmann, Sleepy Hollow, IL (US); Neal Wingen, Inverness, IL (US)

(73) Assignee: Synopsys, Inc., Mountain View, CA (US)

( * ) Notice: Subject to any disclaimer, the term of this patent is extended or adjusted under 35 U.S.C. 154(b) by 225 days.

(21) Appl. No.: 12/919,186

(22) PCT Filed: Sep. 25, 2008

(86) PCT No.: PCT/IB2008/053911
§ 371 (c)(1),
(2), (4) Date: Nov. 17, 2010

(87) PCT Pub. No.: WO2009/040760
PCT Pub. Date: Apr. 2, 2009

(65) Prior Publication Data
US 2011/0050300 A1 Mar. 3, 2011

Related U.S. Application Data

(60) Provisional application No. 60/975,769, filed on Sep. 27, 2007.

(51) Int. Cl.
*H03L 7/00* (2006.01)
(52) U.S. Cl.
USPC .......................................... 327/144; 327/145
(58) Field of Classification Search
USPC ................................................ 327/144–147
See application file for complete search history.

(56) References Cited

U.S. PATENT DOCUMENTS

| | | | |
|---|---|---|---|
| 5,414,308 | A | 5/1995 | Lee et al. |
| 6,252,444 | B1 | 6/2001 | Lee |
| 6,433,645 | B1 | 8/2002 | Mann et al. |
| 6,868,503 | B1 | 3/2005 | Maksimovic et al. |
| 7,205,805 | B1 * | 4/2007 | Bennett ......................... 327/158 |
| 7,539,278 | B2 * | 5/2009 | Shumarayev et al. ......... 375/376 |
| 7,622,979 | B2 * | 11/2009 | Bhatia et al. .................. 327/297 |
| 2001/0048341 | A1 | 12/2001 | Chakravarthy |
| 2003/0137343 | A1 | 7/2003 | Berka et al. |

FOREIGN PATENT DOCUMENTS

| GB | 2 423 606 A | 8/2006 |
|---|---|---|
| GB | 2423606 A | 8/2006 |

OTHER PUBLICATIONS

European Examination Report, European Application No. 08807807.6, Aug. 22, 2011, 6 pages.

(Continued)

*Primary Examiner* — Hai L Nguyen
(74) *Attorney, Agent, or Firm* — Fenwick & West LLP

(57) ABSTRACT

A data processing system comprises a plurality of sub-circuits, a clock generator provided with a control circuit, a pool of oscillator circuits comprising at least three oscillator circuits, and a multiplexing circuit coupled between the pool and clock inputs of the sub-circuits. The multiplexing circuit has a control input coupled to a control output of the control circuit. The multiplexing circuit is configured to couple any selectable one of the oscillator circuits in the pool to a clock input of each of the sub-circuits. The control circuit is configured to set the frequencies of respective ones of the clock circuit by controlling the multiplexing circuit to supply clock signals derived from selected ones of the oscillator circuits to the sub-circuits.

15 Claims, 3 Drawing Sheets

OTHER PUBLICATIONS

Figure 1:
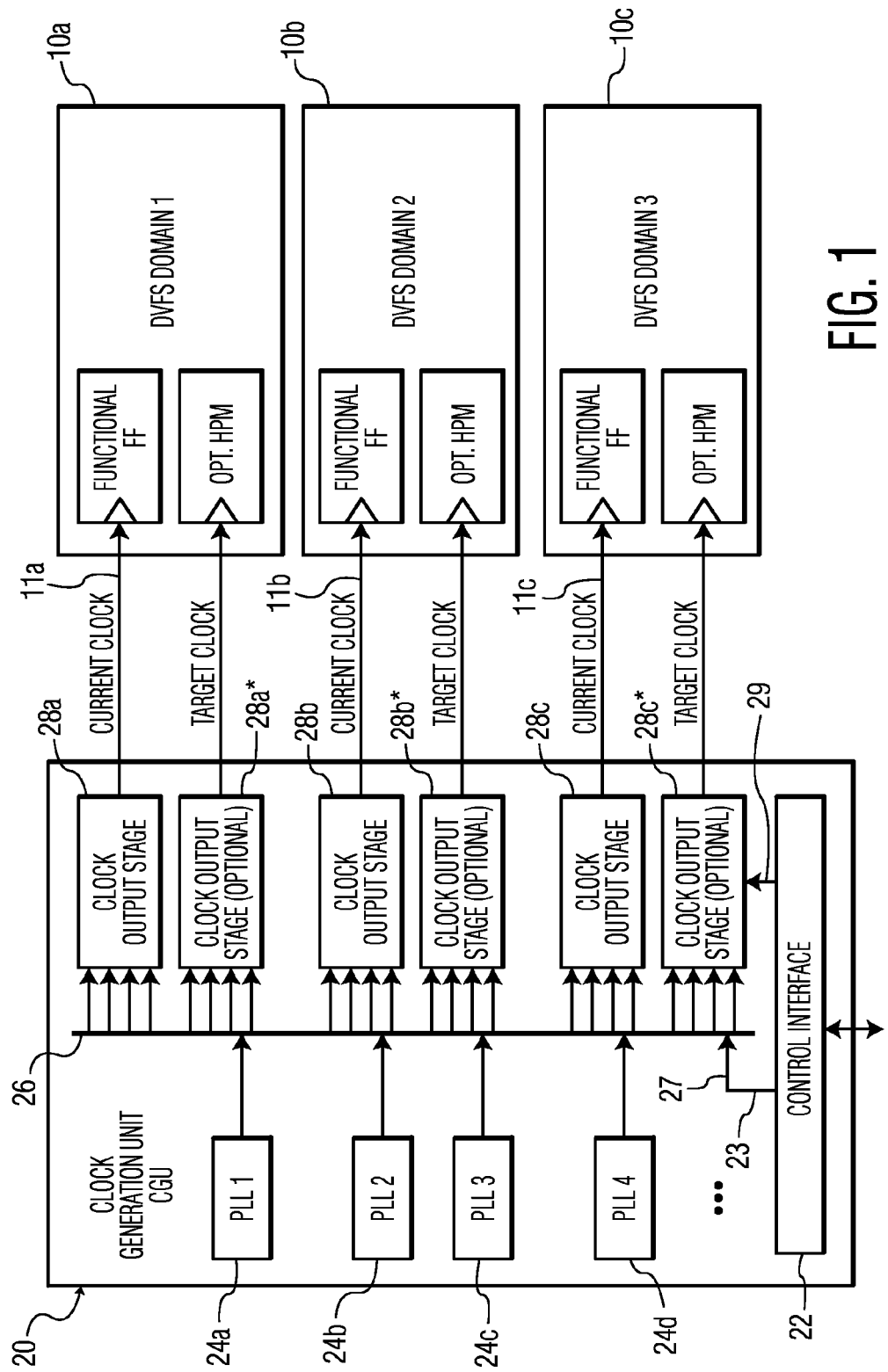

Meijer, M. et al. in "Technology Exploration for Adaptive Power and Frequency Scaling in 90nm CMOS", in Proceedings of the 2004 International Symposium on Low Power Electronics and Design (ISLPED'04), Newport Beach, California, USA, ACM, pp. 14-19, 2004, ISBN: 1-58113-929-2.

PCT Written Opinion, PCT Application No. PCT/IB2008/053911, Feb. 2, 2009, 5 pages.

ISA/EPO, International Search Report dated Jan. 19, 2009 for PCT/IB2009/053911.

Cypress Semiconductor Corporation, "Understanding the CY2291, CY2292, and CY2295," retrieved Jul. 2, 1997 from URL:http://www.eetindia.co.in/ARTICLES/2001MAR/2001MAR29_MRP_CT_AN1.PDF, XP002510929.

European Examination Report, European Application No. 08807807.6, Jun. 18, 2012, 6 pages.

European Summons to Attend Oral Proceedings Pursuant to Rule 115(1) EPC, European Application No. 08807807.6, Feb. 25, 2013, 8 pages.

\* cited by examiner

CLOCK GENERATOR

This application is a 371 national stage application of PCT International Application No. PCT/IB2008/053911 filed on Sep. 25, 2008, which claims priority to U.S. Patent Application No. 60/975,769, filed on Sep. 27, 2007, which is incorporated by reference herein in their entirety.

GB patent no 2423606 describes a method of reducing power consumption of a circuit. The circuit comprises a control circuit, a plurality of data-processing sub-circuits, a power supply circuit with a plurality of power supply outputs coupled to respective ones of the sub-circuits and a clock generator with a plurality of clock signal outputs coupled to respective ones of the sub-circuits. In operation, the control circuit controls the power supply circuit and the clock generator, to set the combinations of power supply voltage and clock frequency that are supplied to respective ones of the sub-circuits.

The control circuit selects the combinations of power supply voltage and clock frequency to maintain sufficient processing power at minimum power consumption. Generally, lowering the power supply voltage and/or the clock frequency reduces power consumption. However, a reduced clock frequency results in lower processing speed of a sub-circuit. A reduction of the power supply voltage indirectly also results in lower processing speed, because it reduces the maximum clock frequency at which a sub-circuit functions properly. Accordingly the control circuit adapts the voltage and frequency to the minimum values that are needed to allow the sub-circuits to perform current operations at sufficient speed.

GB 2423606 does not describe the clock generator in detail. Conventional multiple output clock generators typically contain a plurality of programmable phase locked loop circuits (PLL's), each for a respective one of the sub-circuits. Each PLL locks a frequency divided signal of a voltage controlled oscillator (VCO) to a frequency divided reference signal. The frequency of such a clock generator is programmed by setting the division ratio's.

Such a circuit has several disadvantages. When the frequency of a sub-circuit has to be changed, the programmable division ratio's of the PLL for that sub-circuit have to be changed, after which the PLL has to regain its lock. This means that the clock signal may be temporarily unavailable. Although application of fractional division would render it possible to select from a multitude of clock frequencies this would result in unacceptable amount of jitter. To provide for detailed selection of frequencies, high frequencies are needed, which may lead to radio frequency interference problems.

Among others, it is an object to reduce power consumption in an integrated circuit in a way that allows rapid switch-over of clock-frequency.

According to one aspect, in a data processing system comprising a plurality of sub-circuits, a clock generator is provided with a pool of oscillator circuits, comprising at least three oscillator circuits, and a multiplexing circuit coupled between the pool and clock inputs of the sub-circuits, the multiplexing circuit having a control input coupled to a control output of the control circuit, the multiplexing circuit being configured to to couple any selectable one of the oscillator circuits in the pool to the clock input of each of the sub-circuits. The control circuit is configured to set the frequencies of respective ones of the clock circuit by controlling the multiplexing circuit to supply clock signals derived from selected ones of the oscillator circuits to the sub-circuits.

Use of a pool of oscillator circuits has the advantage that frequencies can be changed between a plurality of different frequencies without needing to stabilize the oscillators or regain the lock. Because the pool is shared by a plurality of sub-circuits, many frequencies can be provided with little circuit overhead.

It is remarked that U.S. Pat. No. 6,252,444 B1 describes a reset signal generating circuit. The circuit described therein comprises a PLL selector, a first and a second PLL, a locking detector and a clock selector. A reset synchronizer provides a internal reset signal on the basis of the locking signal provided by the locking detector and an overflow signal provided by a counter that counts a predetermined number of internal clock signals. Accordingly a device using the clock provided by the circuit of this US patent is maintained in a reset mode until a lock signal is present and a predetermined number of clocksignals is generated. The circuit disclosed in this US patent selects and activates one of the two PLLs. Accordingly only one of the PLLs is activated at a time. This implies that when another PLL is selected some time lapses from the moment that the currently active PLL is stopped until the other PLL has reached a locked state. During that time interval the reset synchronizer will prevent a normal operation of the device using the internal clock signal provided by the circuit.

In clock generator according to the present invention a rapid switch over between different frequencies is possible, as the oscillators are maintained active, even though they are not selected. As different subcircuits use the clocks provided by the clock generator the consequences for the energy consumption are modest.

In a further embodiment, the clock generator comprises at least one frequency divider circuit coupled between an output of the multiplexing circuit and the clock input of a first one of the subcircuits, the frequency divider having a control input for controlling an integer division factor, coupled a further control output of the control circuit. As in this embodiment the clock generator comprises a plurality of oscillator circuits in combination with a plurality of divider circuits it is possible to provide a wide range of different clock frequency settings with a relatively modest amount of means. As the frequency dividers have integer division factors the jitter in the resulting clock signal provided to the subcircuits is relatively low.

In a further embodiment the control circuit forms part of a joint voltage frequency scaling facility, further comprising at least a power mode controller and a controllable power supply facility wherein the controllable power supply facility is controlled by the power mode controller to provide the sub-circuits with a supply voltage sufficient to allow operation of the sub-circuits at the frequencies selected by the control circuit. Values for the supply voltage may be selected that are sufficient to drive the respective sub-circuits under worst-case conditions, e.g. for any temperature in a range of normal operating temperatures. Alternatively at least one sub-circuit may have a monitor that monitors a condition of said at least sub-circuit and selects a supply voltage that is sufficient to drive the that sub-circuits under the monitored value for the condition.

According to another aspect a method is provided for controlling an operating speed of a first plurality of sub-circuits comprising the steps of Providing a second plurality of at least three clock signals,
For each of the plurality of sub-circuits selecting and using one of the clock signals.

Figure 2:
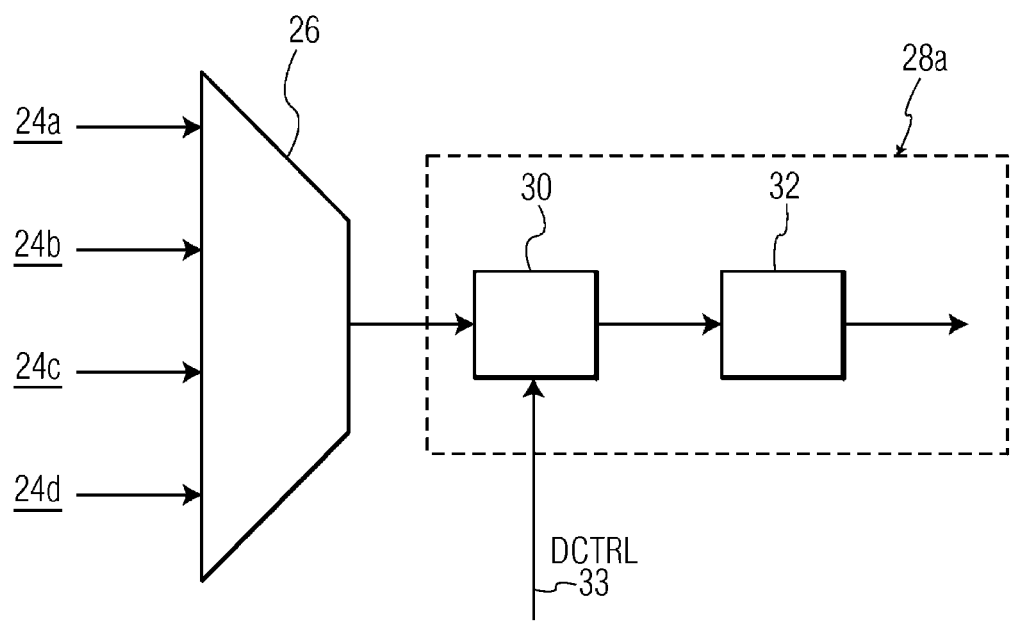
Figure 3:
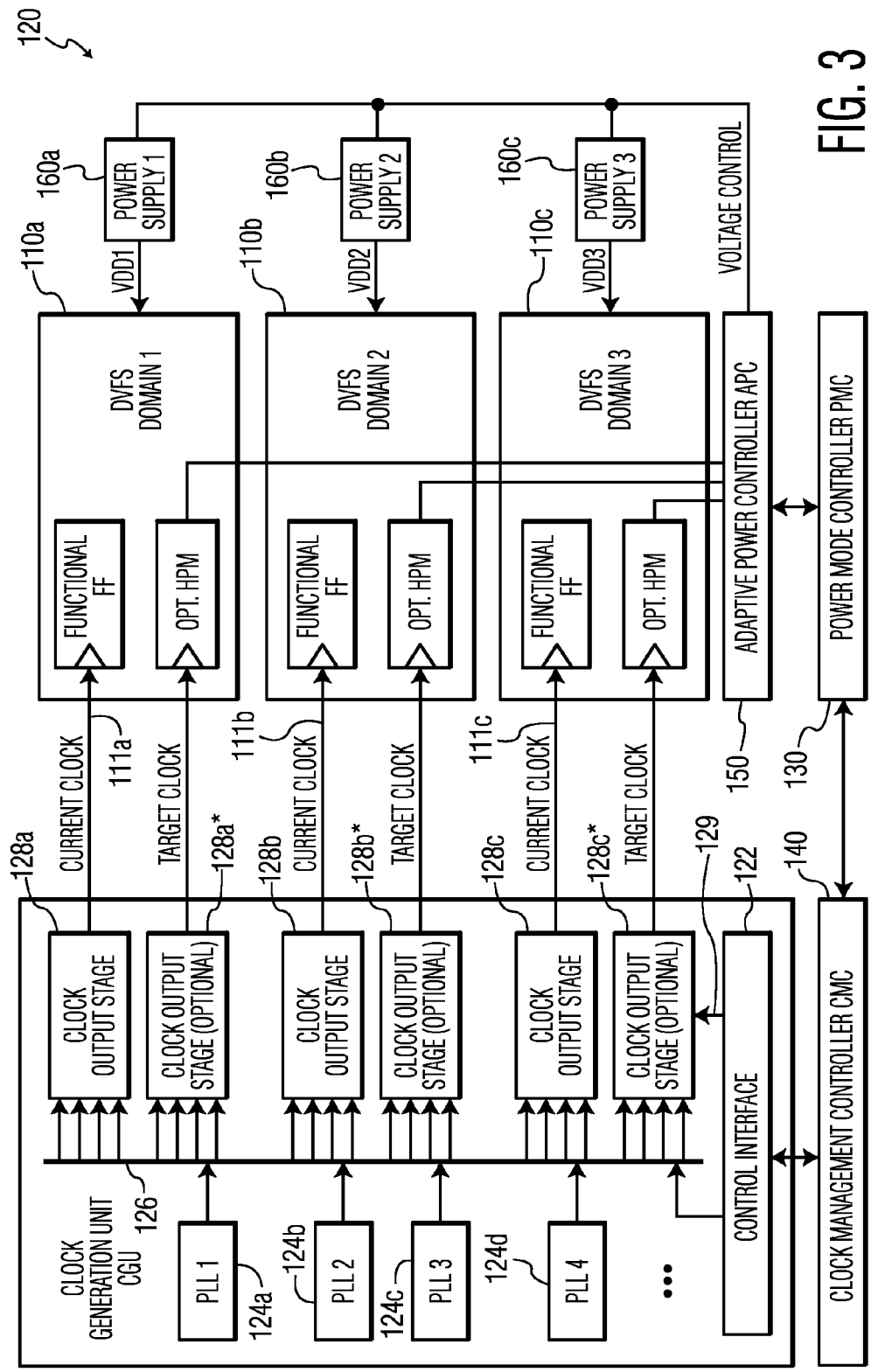

These and other aspects are described in more detail with reference to the drawing. Therein FIG. 1 shows a first embodiment of a data processing system according to the invention, FIG. 2 shows a part of the data processing system of FIG. 1 in more detail, FIG. 3 shows a second embodiment of a data processing system according to the invention.

FIG. 1 shows a data processing system. The data processing system comprises a plurality of sub-circuits 10a, 10a, 10c and a clock generator 20. The clock generator 20 is provided with a control circuit 22, a pool of oscillator circuits 24a, ... 24d and a multiplexing circuit 26 coupled between the pool and clock inputs of the sub-circuits. The pool of oscillator circuits comprises at least three oscillator circuits, here four oscillator circuits having a oscillating frequencies of respectively 250 MHz, 300 MHz, 350 MHz and 400 MHz.

The multiplexing circuit 26 has a control input 27 coupled to a control output 23 of the control circuit 22. The multiplexing circuit 26 is configured to couple any selectable one of the oscillator circuits 24a, ... 24d in the pool to a clock input 11a, 11b, 11c of each of the sub-circuits. The control circuit 22 is configured to set the frequencies of respective ones of the clock circuit by controlling the multiplexing circuit 26 to supply clock signals derived from selected ones of the oscillator circuits 24a, ... 24d to the sub-circuits.

In the embodiment shown the subcircuits 10a, 10b, 10c are coupled to the multiplexing circuit 26 via clock output stages 28a, 28b, 28c, 28d. By way of example the clock output stage 28a is shown in more detail in FIG. 2. The clock output stage 28a comprises a frequency divider circuit 30 that is controllable by an input signal 33 (Dctrl). A multiplexer 26 selects an input clock signal for the frequency divider circuit 30 from the clock signals provided by the clock circuits 24a, 24b, 24c, 24d. The clock output stage further comprises a glitch removal module 32 to suppress glitches in the clock signal that could result from a switch-over from a current to a next operating frequency. Such a module is known as such from US2003137343, EP1303043 and US2001048341, for example.

In the embodiment shown, each sub-circuit 10a, 10b, 10c further is coupled to a target clock output stage 28a*, 28b*, 28c*. The combination of separate clock output stages 28a, 28b, 28c for providing a current clock and target clock output stage 28a*, 28b*, 28c* for providing a target clock allows an adaptive closed loop voltage control. A combination of a current clock with a target clock running at for example ⅓ of the current clock frequency is described in U.S. Pat. No. 6,868,503. This document describes a hardware performance monitor comprising a delay chain through which a clock wave propagates. For loop regulation reasons, the delay in the delay chain is at least 3 times longer than the delay in the critical path of the design.

FIG. 3 shows an embodiment wherein adaptive closed loop voltage control is applied. The combination of frequency and voltage control is also denoted as dynamic voltage and frequency scaling (DVFS), the scaling may be adaptive using a closed loop regulation (AVS), or not i.e. open loop regulation (DVS). Parts in FIG. 3 corresponding to those in FIG. 1 have a reference number that is 100 higher. Each of the sub-circuits 110a, 110b, 110c has its own power supply 160a, 160b 160c. The to power supplies 160a, 160b 160c on their turn are controlled by an adaptive power controller 150 that is controlled by a power mode controller 130. The power mode controller 130 further controls a clock management controller 140 that controls the control circuit 122 of the clock generator. In this embodiment a sub-circuit in the data-processing system may have one of a plurality of operating points defined by a current clock, and a supply voltage VDD supplied to the sub-circuit. The frequency of the current clock amounts to the frequency of a selected oscillator, selected from PLL1, PLL2, PLL3, PLL4 divided by a division factor IDIV.

In the embodiment shown in FIG. 3 the clock management controller 140 acts as a front-end to the control interface 122 of the clock generation unit 120. The clock management controller 140 may for example carry out macros that perform normal read and write actions to registers in the control interface 122. The macro commands are called by a power mode controller 130. For example a DVFS policy can use macro commands to switch between PLLs and to re-program PLLs when changing from one operating point to another. Another application is to use macro commands to perform sequencing for oscillator and PLL power management The power mode controller 130 receives input signals to condition the start and the termination of a power reduction mode (sleep events and wakeup events respectively). Using these signals it controls system level power reduction modes by controlling the mode of related components (on-chip networks, L2 cache, SDRAM controller) in a defined sequence through mode control handshake interfaces It performs control sequences in conjunction with mode transitions
  to enable/disable clock outputs of the clock generation unit 120
  to enable/disable power supply switches and clamps,
  to control transitions from one DVFS {f, V} operating point to another Additionally it may adapt the power control to a measured condition. For example it may receive a signal indicative for the temperature and/or silicon characteristics of a sub-circuit 110a, to adapt the voltage applied to that circuit.

The power mode controller 130 further controls an adaptive power controller 150. The adaptive power controller 150 functions as an interface that communicates with the power supplies 160a, 160b, 160c. The adaptive power controller 150 supports open loop DVS by programming a VDD regulator in the power supplies 160a, 160b, 160c to a pre-defined level that matches the performance requirements of a DVFS operating point under worst case process and temperature conditions. These DVFS operating points are selected by power management software executed by the power mode controller 130. In that embodiment the power mode controller is a programmable device. Alternatively the power mode controller may be carried out as dedicated hardware. In an embodiment the power mode controller may request adjustment of the VDD level through a DVFS Control Interface indicating a Target Performance Index. The adaptive power controller acknowledges this request with a Current Performance Index equal to the Target Performance Index after a pre-programmed delay. After this delay it can be assumed that the VDD level supplied by the controlled power supply 160a, b, c is high enough to meet the performance requirements of the DVFS operating point.

The adaptive power controller 150 may further support closed loop AVS by continuously controlling a power supply 160a, 160b, 160c to the minimum level that matches the performance requirements of a DVFS operating point under actual process and temperature conditions. Measurement of silicon performance is done in performance monitor circuits (not shown) placed in the sub-circuits 110a, 110b, 110c. The performance monitor circuits may be programmable by the adaptive power controller 150 for calibration purposes.

A method for simultaneous control of supply voltage and clock speed is for example described by Meijer et al. in "Technology Exploration for Adaptive Power and Frequency Scaling in 90 nm CMOS", in Proceedings of the 2004 international symposium on Low power electronics and design, Newport Beach, Calif., USA, pp. 14-19, 2004, ISBN:1-58113-929-2.

As in the open loop control mode DVS, the power mode controller 130 selects DVFS operating points leading to a request to the adaptive power controller 150. The adaptive power controller 150 acknowledges the request after a pre-programmed delay provided that the measured silicon performance matches the requested performance. The adaptive power controller 150 further controls the transition between ACTIVE and SLEEP states of the power supplies by issuing commands. In SLEEP state, regulators in the IC change to a pre-programmed alternative VDD level (retention level or zero voltage).

By way of example the operation of a data processing system according to the embodiment of FIG. 3 is illustrated with reference to the following table. For each operating point of the data processing system given in column 1 the table specifies the required current clock frequency (col. 2) and target clock frequency (col. 3), as well as the required supply voltage VDD (col. 4). The clock generator 20 used comprises a plurality of oscillator circuits in the form of PLLs, numbered PLL1, PLL2 PLL3, PLL 4. Additionally a division factor IDIV by which the selected clock signal is divided is selected from the numbers 1, 2, 3, 4, 5, 6, 12 and 15. Columns 5 and 6 of the table respectively show the clock parameters (PLL, IDIV) by the control interface 122 for the current clock and for the target clock respectively.

The invention claimed is:

1. A data processing system comprising:
   a plurality of sub-circuits, each sub-circuit in the plurality of sub-circuits having a clock input;
   a clock generator comprising:
      a plurality of oscillator circuits,
      a multiplexing circuit coupled between the plurality of oscillator circuits and the clock input of each of the sub-circuits, the multiplexing circuit configured to couple one of the plurality of oscillator circuits to the clock input of each of the sub-circuits based on a control output, and
      a control circuit configured to generate the control output; and
   a power mode controller coupled to the control circuit and a controllable power supply facility, the power mode controller configured to select an operating point of a sub-circuit to match measured performance of the sub-circuit with a requested performance of the sub-circuit, the operating point defining a clock signal with a predetermined frequency and a supply voltage of a predetermined voltage level,
   wherein, responsive to selection of the operating point by the power mode controller, the controllable power supply facility providing the sub-circuit with the defined supply voltage of the predetermined voltage level and the control circuit generating the control output causing the multiplexing circuit to couple the sub-circuit with

| Operating Point | Current Clock | Target Clock | VDD | Current Clock Parameters | Target Clock Parameters |
|---|---|---|---|---|---|
| 1 | 50 MHz | 17 MHz | 0.8 V | PLL1 = 250 MHz, IDIV = 5 | PLL1 = 250 MHz, IDIV = 15 |
| 2 | 100 | 33 | 0.85 V | PLL4 = 400 MHz, IDIV = 4 | PLL4 = 400 MHz, IDIV = 12 |
| 3 | 150 | 50 | 0.9 V | PLL2 = 300 MHz, IDIV = 2 | PLL2 = 300 MHz, IDIV = 6 |
| 4 | 200 | 67 | 0.95 V | PLL4 = 400 MHz, IDIV = 2 | PLL4 = 400 MHz, IDIV = 6 |
| 5 | 250 | 83 | 1.0 V | PLL1 = 250 MHz, IDIV = 1 | PLL1 = 250 MHz, IDIV = 3 |
| 6 | 300 | 100 | 1.05 V | PLL2 = 300 MHz, IDIV = 1 | PLL2 = 300 MHz, IDIV = 3 |
| 7 | 350 | 116 | 1.1 V | PLL3 = 350 MHz, IDIV = 1 | PLL3 = 350 MHz, IDIV = 3 |
| 8 | 400 | 133 | 1.2 V | PLL 4 = 400 MHz, IDIV = 1 | PLL4 = 400 MHz, IDIV = 3 |

While the invention has been illustrated and described in detail in the drawings and foregoing description, such illustration and description are to be considered illustrative and exemplary and not restrictive; the invention is not limited to the disclosed embodiments.

Other variations to the disclosed embodiments can be understood and effected by those skilled in the art in practicing the claimed invention, from a study of the drawings, the disclosure and the appended claims. In the claims the word "comprising" does not exclude other elements or steps, and the indefinite article "a" or "an" does not to exclude a plurality. A single processor or other unit may fulfill the functions of several items recited in the claims. The mere fact that certain measures are recited in mutually different claims does not indicate that a combination of these measures cannot be used to advantage. Any reference signs in the claims should not be construed as limiting the scope.

one of the plurality of the oscillator circuits that generate a clock signal of the predetermined frequency.

2. The data processing system of claim 1, comprising at least one frequency divider circuit coupled between the multiplexing circuit and the clock input of the sub-circuit, the frequency divider having a frequency control input for controlling a division factor, the frequency control input coupled to another control output of the control circuit.

3. The data processing system of claim 1, wherein the control circuit is coupled to the power mode controller via a clock management controller, wherein the power mode controller controls the control circuit by initiating a macro by the clock management controller.

4. The data processing system of claim 1, wherein at least one of the sub-circuits in the plurality of sub-circuits comprises a monitor for monitoring a condition of said at least one sub-circuit and
   wherein the controllable power supply facility is controlled by the power mode controller to provide the plurality of sub-circuits with a supply voltage sufficient to allow operation of said at least one sub-circuit at the frequency selected by the control circuit for said at least one sub-circuit under the condition observed by the monitor.

5. A method for selecting an operating point of a plurality of sub-circuits, the method comprising:
generating a plurality of clock signals by a plurality of oscillator circuits;
selecting an operating point of a sub-circuit from the plurality of sub-circuit to match measured performance of the sub-circuit with a requested performance of the sub-circuit, the operating point defining a clock signal with a predetermined frequency and a supply voltage of a predetermined voltage level; and
responsive to selecting the operating point of the sub-circuit, providing the sub-circuit with the supply voltage of the predetermined voltage level;
responsive to selecting the operating point of the sub-circuit, generating a control output instructing coupling the sub-circuit with one of the plurality of the oscillator circuits that generates a clock signal of the predetermined frequency; and
coupling one of the plurality of oscillator circuits to the clock input of each of the sub-circuits based on the control output.

6. The method of claim 5, further comprising:
monitoring a condition of at least one sub-circuit in the plurality of sub-circuits; and
using the condition to determine if the at least one sub-circuit is operating as desired.

7. The method of claim 5, further comprising:
altering the frequency of at least one of the plurality of clock signals generated by the plurality of the oscillator circuits based on another control output.

8. The method of claim 7, wherein the frequency of the at least one of the plurality of clock signals is altered by setting a division factor in a frequency divider.

9. The method of claim 7, wherein a macro is used to control a frequency of the at least one of the plurality of clock signals and a voltage level of the supply voltage of the sub-circuit.

10. A device comprising:
a clock generator comprising:
a plurality of oscillator circuits,
a multiplexing circuit configured to receive a plurality of clock signals output from the plurality of oscillator circuits and to couple one of the plurality of oscillator circuits to a clock input of each of a plurality of sub-circuits based on a control output;
a control circuit configured to generate the control output; and
a power mode controller coupled to the control circuit and a controllable power supply facility, the power mode controller configured to select an operating point of a sub-circuit, the operating point defining a clock signal with a predetermined frequency and a supply voltage of a predetermined voltage level,
wherein, responsive to the selection of the operating point for the sub-circuit, the controllable power supply facility providing the sub-circuit with the defined supply voltage of the predetermined voltage level and the control circuit generating the control output causing the multiplexing circuit to couple the sub-circuit with one of the plurality of the oscillator circuits that generate a clock signal of the predetermined frequency.

11. The device of claim 10, comprising at least one frequency divider circuit coupled between the multiplexing circuit and the clock input of the sub-circuit, the frequency divider having a frequency control input for controlling a division factor, the frequency control input coupled to another control output of the control circuit.

12. The device of claim 10, wherein at least one of the sub-circuits in the plurality of sub-circuits comprises a monitor for monitoring a condition of said at least one sub-circuit and
wherein the controllable power supply facility is controlled by the power mode controller to provide the plurality of sub-circuits with a supply voltage sufficient to allow operation of said at least one sub-circuit at the frequency selected by the control circuit for said at least one sub-circuit under the condition observed by the monitor.

13. The device of claim 10, wherein the control circuit is coupled to the power mode controller via a clock management controller, wherein the power mode controller controls the control circuit by initiating a macro by the clock management controller.

14. An integrated circuit comprising:
a plurality of sub-circuits, each sub-circuit in the plurality of sub-circuits having a clock input;
a clock generator comprising:
a plurality of oscillator circuits,
a multiplexing circuit coupled between the plurality of oscillator circuits and the clock input of each of the sub-circuits, the multiplexing circuit configured to couple one of the plurality of oscillator circuits to the clock input of each of the sub-circuits based on a control output, and
a control circuit configured to generate the control output; and
a power mode controller coupled to the control circuit and a controllable power supply facility, the power mode controller configured to select an operating point of a sub-circuit to match measured performance of the sub-circuit with a requested performance of the sub-circuit, the operating point defining a clock signal with a predetermined frequency and a supply voltage of a predetermined voltage level,
wherein, responsive to selection of the operating point by the power mode controller, the controllable power supply facility providing the sub-circuit with the defined supply voltage of the predetermined voltage level and the control circuit generating the control output causing the multiplexing circuit to couple the sub-circuit with one of the plurality of the oscillator circuits that generate a clock signal of the predetermined frequency.

15. An integrated circuit comprising:
a clock generator comprising:
a plurality of oscillator circuits, and
a multiplexing circuit configured to receive a plurality of clock signals from the plurality of oscillator circuits and to couple one of the plurality of oscillator circuits to a clock input of each of a plurality of sub-circuits based on a control output;
a control circuit configured to generate the control output; and
a power mode controller coupled to the control circuit and a controllable power supply facility, the power mode controller configured to select an operating point of a sub-circuit, the operating point defining a clock signal with a predetermined frequency and a supply voltage of a predetermined voltage level,
wherein, responsive to the selection of the operating point for the sub-circuit, the controllable power supply facility providing the sub-circuit with the defined supply voltage of the predetermined voltage level and the control circuit generating the control output causing the multiplexing circuit to couple the sub-circuit with one of the plurality of the oscillator circuits that generate a clock signal of the predetermined frequency.

* * * * *